(12) United States Patent
Konno et al.

(10) Patent No.: US 10,072,123 B2
(45) Date of Patent: Sep. 11, 2018

(54) POLYARYLENE SULFIDE PRODUCTION METHOD AND POLYARYLENE SULFIDE

(71) Applicant: Kureha Corporation, Tokyo (JP)

(72) Inventors: Akihiro Konno, Tokyo (JP); Ken-Ichi Takaki, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/540,636

(22) PCT Filed: Dec. 18, 2015

(86) PCT No.: PCT/JP2015/085563
§ 371 (c)(1),
(2) Date: Jun. 29, 2017

(87) PCT Pub. No.: WO2016/108270
PCT Pub. Date: Jul. 7, 2016

(65) Prior Publication Data
US 2017/0362387 A1 Dec. 21, 2017

(30) Foreign Application Priority Data
Dec. 29, 2014 (JP) .................................. 2014-266967

(51) Int. Cl.
| | | |
|---|---|---|
| C08G 75/00 | (2006.01) | |
| C08G 75/0259 | (2016.01) | |
| C08G 75/0213 | (2016.01) | |
| C08G 75/0281 | (2016.01) | |

(52) U.S. Cl.
CPC ..... *C08G 75/0259* (2013.01); *C08G 75/0213* (2013.01); *C08G 75/0281* (2013.01)

(58) Field of Classification Search
CPC ................ C08G 75/14; C08G 75/0263; C08G 75/0268; C08G 75/0259; C08G 75/025; B30B 9/28
See application file for complete search history.

(56) References Cited

U.S. PATENT DOCUMENTS

| | | | | |
|---|---|---|---|---|
| 5,268,451 A | * | 12/1993 | Iizuka | ................ C08G 75/0254 525/537 |
| 7,834,133 B2 | | 11/2010 | Suzuki | |
| 2007/0265425 A1 | | 11/2007 | Suzuki et al. | |
| 2011/0124825 A1 | | 5/2011 | Konno et al. | |
| 2011/0178268 A1 | | 7/2011 | Suzuki et al. | |

FOREIGN PATENT DOCUMENTS

| | | |
|---|---|---|
| JP | 2000191785 A | 7/2000 |
| KR | 1020070072621 A | 7/2007 |
| WO | WO2006046748 A1 | 5/2006 |
| WO | WO2010010760 A1 | 1/2010 |
| WO | WO2010013545 A1 | 2/2010 |

OTHER PUBLICATIONS

International Search Report for PCT/JP2015/085563 dated Mar. 22, 2016.
Office Action issued to KR Patent Application No. 10-2017-7018881, dated Mar. 9, 2018.
Notification of Reasons for Refusal issued to JP Patent Application No. 2016-567303, dated May 15, 2018.

* cited by examiner

*Primary Examiner* — Shane Fang
(74) *Attorney, Agent, or Firm* — Abel Law Group, LLP

(57) ABSTRACT

A method of producing polyarylene sulfide (PAS) by subjecting a sulfur source and a dihalo aromatic compound (DHA) to polymerization reaction in an organic amide solvent under alkaline conditions, the method suppressing side reactions or the like and yielding PAS having a high degree of polymerization at a high yield is provided; and PAS having a high degree of polymerization are provided.

A method of producing PAS, including: a preparation step of preparing a preparation mixture containing an organic amide solvent, a sulfur source, an alkali metal hydroxide, water, and DHA, and having a pH of 12.5 or higher; a first-stage polymerization step of heating the preparation mixture to 170° C. or higher to initiate a polymerization reaction and continuing the polymerization reaction at 240 to 280° C., thereby forming a prepolymer having a DHA conversion rate of 50% or greater (at this time, a temperature increasing rate from 220° C. to 240° C. is lower than a temperature increasing rate for 240° C. or higher); and a second-stage polymerization step of adding, in the reaction system, an alkali metal hydroxide in an amount of 1 to 20 mol % per 1 mol of the sulfur source in the presence of a phase separation agent to continue the polymerization reaction at 245 to 290° C. PAS having a melt viscosity (310° C.; shear rate: 1216 $sec^{-1}$) of 0.1 to 8000 Pa·s produced by the method.

8 Claims, No Drawings

POLYARYLENE SULFIDE PRODUCTION METHOD AND POLYARYLENE SULFIDE

TECHNICAL FIELD

The present invention relates to a method of producing polyarylene sulfide in which a sulfur source and a dihalo aromatic compound are subjected to a polymerization reaction in an organic amide solvent. The present invention particularly relates to a method of producing polyarylene sulfide in which a sulfur source and a dihalo aromatic compound are subjected to a polymerization reaction in an organic amide solvent under particular alkaline conditions.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. The PAS has been widely used in a wide variety of fields of electric/electronic devices, devices for automobiles, and the like, because the PAS can be formed into various molded products, films, sheets, fibers, and the like by ordinary melt processing methods such as extrusion molding, injection molding, and compression molding.

As a representative method of producing PAS, a method in which a sulfur source and a dihalo aromatic compound such as p-dichlorobenzene, or the like (hereinafter, also referred to as "pDCB") are subjected to a polymerization reaction in an organic amide solvent such as N-methyl-2-pyrrolidone, or the like (hereinafter, also referred to as "NMP") has been known. As the sulfur source, a method in which an alkali metal sulfide formed by reacting mainly an alkali metal sulfide, an alkali metal hydrosulfide, and an alkali metal hydroxide in situ is used is also known. Furthermore, a method in which an alkali metal sulfide formed by reacting an alkali metal hydroxide and hydrogen sulfide is used as a raw material of a sulfur source is also known.

For a method of producing PAS in which a sulfur source and a dihalo aromatic compound are subjected to a polymerization reaction in an organic amide solvent under alkaline conditions, particularly in the presence of an alkali metal hydroxide, an attempt has been made to set conditions to stably perform the polymerization reaction and to suppress side reactions. That is, in this polymerization method, since an alkali metal hydroxide, such as sodium hydroxide (NaOH), or the like, is used at a high concentration during the polymerization reaction, the organic amide solvent is readily hydrolyzed by the alkali metal hydroxide and the decomposition product may be the cause of side reactions.

Patent Document 1 discloses a method of producing PAS, including: a preparation step of preparing a preparation mixture containing an organic amide solvent, a sulfur source, an alkali metal hydroxide, water, and a dihalo aromatic compound, and having a pH of 12.5 or higher; a first-stage polymerization step of heating the preparation mixture to a temperature of 170 to 270° C. to initiate a polymerization reaction, thereby forming a prepolymer having a dihalo aromatic compound conversion rate of 50% or greater; and a second-stage polymerization step of adding a phase separation agent into the reaction system containing the prepolymer and adding an alkali metal hydroxide in an amount corresponding to 1 to 10 mol % per 1 mol of the sulfur source at a time or in portions, thereby continuing the polymerization reaction at a temperature of 240 to 290° C. This method is a good method of producing PAS that stably and efficiently produces PAS having excellent reactivity with a silane coupling agent; however, further improvement has been demanded from the perspectives of yield of the PAS polymer, suppression of byproduct formation, and the like.

Therefore, as a method of producing PAS in which a sulfur source and a dihalo aromatic compound are subjected to polymerization reaction in an organic amide solvent under alkaline conditions, a method of producing PAS that can suppress side reactions caused by adding other alkali metal hydroxide and that can produce PAS having a high degree of polymerization at a high yield has been desired.

CITATION LIST

Patent Literature

Patent Document 1: WO 2006/046748

SUMMARY OF INVENTION

Technical Problem

An object of the present invention is to provide a method of producing PAS in which a sulfur source and a dihalo aromatic compound are subjected to polymerization reaction in an organic amide solvent under alkaline conditions, and the method suppresses side reactions that are caused by adding other alkali metal hydroxide and produces PAS having a high degree of polymerization at a high yield. Another object of the present invention is to provide PAS that can be efficiently obtained and that has a high degree of polymerization.

Solution to Problem

As a result of diligent research to solve the problems described above, the present inventors found that the problems can be solved by employing a method of producing PAS, including a first-stage polymerization step of a reaction mixture that is in a uniformly dissolved state and a second-stage polymerization step in a phase-separated state, and at this time, a particular temperature condition is selected in the first-stage polymerization step and then the polymerization reaction is continued as a second-stage polymerization step by adding a particular amount of alkali metal hydroxide at a time or in portions in the presence of a phase separation agent in the reaction system, and thus completed the present invention.

According to the present invention, a method of producing PAS by subjecting a sulfur source and a dihalo aromatic compound to polymerization in an organic amide solvent, the method including:

(1) a preparation step of preparing a preparation mixture containing an organic amide solvent, a sulfur source, an alkali metal hydroxide, water, and a dihalo aromatic compound, and having a pH of 12.5 or higher;

(2) a first-stage polymerization step of heating the preparation mixture to a temperature of 170° C. or higher to initiate a polymerization reaction and continuing the polymerization reaction at temperatures of 240 to 280° C., thereby forming a prepolymer having a dihalo aromatic compound conversion rate of 50% or greater; and (3) a second-stage polymerization step of adding an alkali metal hydroxide in an amount corresponding to 1 to 20 mol % per 1 mol of the sulfur source at a time or in portions into the reaction system containing the prepolymer in the presence of a phase separation agent, thereby continuing the polymerization reaction at temperatures of 245 to 290° C.; a temperature increasing rate for temperatures from 220° C. to 240° C. being lower than a temperature increasing rate for temperatures of 240° C. or higher in the first-stage polymerization step, is provided. According to the present invention, PAS having a melt viscosity of 0.1 to 8000 Pa·s measured at a temperature of 310° C. and a shear rate of 1216 sec$^{-1}$, produced by the method of producing PAS described above, is also provided.

Advantageous Effects of Invention

According to the present invention, a method of producing PAS in which a sulfur source and a dihalo aromatic compound are subjected to polymerization reaction in an organic amide solvent under alkaline conditions, the method suppressing side reactions that are caused by adding other alkali metal hydroxide and producing PAS having a high degree of polymerization at a high yield; and PAS that can be efficiently obtained and that has a high degree of polymerization can be provided.

DESCRIPTION OF EMBODIMENTS

1. Sulfur Source

As a sulfur source in the present invention, a sulfur source containing one or both of an alkali metal sulfide and an alkali metal hydrosulfide is preferably used. As the sulfur source, hydrogen sulfide can be also used. Specifically, an alkali metal hydrosulfide (e.g., NaSH) or an alkali metal sulfide (e.g., Na$_2$S) can be produced by blowing hydrogen sulfide into an alkali metal hydroxide (e.g., NaOH). As the sulfur source, an alkali metal hydrosulfide or a sulfur source containing the alkali metal hydrosulfide as a main component is more preferable.

Examples of the alkali metal hydrosulfide include lithium hydrosulfide, sodium hydrosulfide, potassium hydrosulfide, rubidium hydrosulfide, cesium hydrosulfide, and mixtures of two or more types thereof, but the alkali metal hydrosulfide is not limited to these. The alkali metal hydrosulfide may be used in the form of anhydrate, hydrate, or aqueous solution. Among these, sodium hydrosulfide and lithium hydrosulfide are preferable from the perspective of being readily available industrially at a low price. The alkali metal hydrosulfide used in the present invention may also contain a small amount of alkali metal sulfide.

Examples of the alkali metal sulfide include lithium sulfide, sodium sulfide, potassium sulfide, rubidium sulfide, cesium sulfide, and mixtures of two or more types thereof, but the alkali metal sulfide is not limited to these. The alkali metal sulfide may be used in the form of anhydrate, hydrate, or aqueous solution. Among these, sodium sulfide is preferable from the perspective of being readily available industrially at a low price and being easy to handle. As these alkali metal sulfides, alkali metal sulfides ordinarily commercially available in the form of hydrates can be used in addition to those contained as byproducts in the alkali metal hydrosulfide. Examples of the hydrate of alkali metal sulfide include sodium sulfide nonahydrate, and sodium sulfide pentahydrate.

The total amount of moles of the alkali metal hydrosulfide and the alkali metal sulfide is the amount of moles of the sulfur source that directly relates to the production of PAS (hereinafter, also referred to as "charged sulfur source" or "effective sulfur source"). Furthermore, in the case where a dehydration step is performed before a preparation step, this total amount of moles is the amount of moles of the sulfur source after the dehydration step.

2. Alkali Metal Hydroxide

Examples of the alkali metal hydroxide include lithium hydroxide, sodium hydroxide, potassium hydroxide, rubidium hydroxide, cesium hydroxide, and mixtures of two or more types thereof, but the alkali metal hydroxide is not limited to these. Among these, sodium hydroxide (NaOH) is preferable from the perspective of being readily available industrially at a low price.

3. Dihalo Aromatic Compound

A dihalo aromatic compound used in the present invention is a dihalogenated aromatic compound having two halogen atoms directly bonded to an aromatic ring. Specific examples of the dihalo aromatic compound include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, dihalodiphenyl ketone, or the like.

Note that the halogen atom indicates each atom of fluorine, chlorine, bromine, or iodine, and the two halogen atoms in the dihalo aromatic compound may be the same or different. The dihalo aromatic compound may be used alone or in a combination of two or more types thereof. The dihalo aromatic compound is preferably p-dihalobenzene in which halogen atoms are a chlorine atom, that is, p-dichlorobenzene (pDCB).

4. Molecular Weight Adjusting Agent, Branching/Crosslinking Agent

To form a terminal having a specific structure on PAS to be produced or to adjust a polymerization reaction and/or the molecular weight, a monohalo compound (not necessarily an aromatic compound) may be used together. Furthermore, to produce a branched or crosslinked polymer, a polyhalo compound (not necessarily an aromatic compound) in which three or more halogen atoms are bonded, an active hydrogen-containing halogenated aromatic compound, a halogenated aromatic nitro compound, or the like may be used together. Preferable examples of the polyhalo compound as a branching/crosslinking agent include trihalobenzene.

5. Organic Amide Solvent

In the present invention, as a solvent for a dehydration reaction and a polymerization reaction, an organic amide solvent which is an aprotic polar organic solvent is used. The organic amide solvent is preferably an organic amide solvent which is stable against alkali at high temperatures. Specific examples of the organic amide solvent include amide compounds such as N,N-dimethylformamide, N,N-dimethylacetamide, and the like; N-alkylcaprolactam compounds such as N-methyl-ε-caprolactam, and the like; N-alkylpyrrolidone compounds or N-cycloalkylpyrrolidone compounds, such as N-methyl-2-pyrrolidone (NMP), N-cyclohexyl-2-pyrrolidone, and the like; N,N-dialkylimidazolidinone compounds such as 1,3-dialkyl-2-imidazolidinone, and the like; tetraalkyl urea compounds such as tetramethyl urea, and the like; and hexaalkylphosphate triamide compounds such as hexamethyl phosphate triamide, or the like. The organic amide solvent may be used alone or in combination of two or more types thereof.

Among these organic amide solvents, N-alkylpyrrolidone compounds, N-cycloalkylpyrrolidone compounds, N-alkylcaprolactam compounds, and N,N-dialkylimidazolidinone compounds are preferable. In particular, N-methyl-2-pyrrolidone (NMP), N-methyl-ε-caprolactam, or 1,3-dialkyl-2-imidazolidinone is preferably used.

6. Polymerization Aid

In the present invention, for the purposes of accelerating the polymerization reaction and obtaining PAS having a high degree of polymerization in a short period of time, various polymerization aids may be used as necessary. Example of the polymerization aids include organic sulfonic acid metal salts, which are generally known as a polymerization aid of PAS, lithium halides, organic carboxylic acid metal salts, phosphoric acid alkali metal salts, or the like. The amount of the polymerization aid to be used is typically in a range from 0.01 to 10 mol per 1 mol of the sulfur source (charged sulfur source) although the amount varies depending on the type of the compound to be used.

7. Phase Separation Agent

In the present invention, particularly in a polymerization step for PAS, a phase separation agent may be contained in the reaction mixture from the perspective of accelerating the polymerization reaction and obtaining PAS having a high degree of polymerization in a short period of time. Specifically, the method of producing PAS of the present invention is a method of producing PAS in the presence of the phase separation agent. The phase separation agent is used to perform liquid-liquid phase separation of the reaction mixture, in which the polymerization reaction has proceeded for a certain degree (liquid phase), into two phases, which are a concentrated polymer phase (dissolved PAS phase) and a dilute polymer phase (organic amide solvent phase). Typically, publicly known phase separation agents of PAS can be used as the phase separation agent, and examples thereof include at least one type selected from the group consisting of organic carboxylic acid metal salts, organic sulfonic acid metal salts, alkali metal halides, alkaline earth metal halides, alkaline earth metal salts of aromatic carboxylic acids, phosphoric acid alkali metal salts, alcohols, paraffin hydrocarbons, and water. The phase separation agent may be used alone or in combination of two or more types thereof. Among the phase separation agents, water and organic carboxylic acid metal salts, such as sodium acetate, lithium acetate, lithium propionate, lithium benzoate, and the like, and a mixture of these are preferable. Water is more preferable because of low cost and ease in post-treatment. The amount of the phase separation agent to be used varies depending on the type of the compound to be used; however, the amount is typically in a range of 0.01 to 20 mol, and preferably in a range of 0.1 to 15 mol, per 1 kg of the organic amide solvent.

The phase separation agent may be present in the reaction mixture from the early stage of the polymerization reaction; however, the phase separation agent may be also added in the middle of the polymerization reaction. Furthermore, typically, the phase separation agent may be added to the reaction mixture after the completion of the polymerization reaction to form a liquid-liquid phase separation state and then cooled. By the appropriate cooling, a granular PAS can be obtained. In the present invention, the polymerization reaction is continued in a second-stage polymerization step in a state where a concentrated polymer phase and a dilute polymer phase are phase-separated in the reaction system.

8. Dehydration Step

In the preparation step in the method of producing PAS of the present invention, a preparation mixture having a pH of 12.5 or higher and containing the organic amide solvent, the sulfur source, the alkali metal hydroxide, water, and the dihalo aromatic compound is prepared. Before the preparation step, a dehydration step of discharging at least a part of distillate containing water from a system, containing the mixture of an organic amide solvent, a sulfur source, and an alkali metal hydroxide, to outside the system by heating the mixture is preferably performed.

That is, the sulfur source often contains water such as hydrated water (crystallization water). When the sulfur source and the alkali metal hydroxide are used in the form of aqueous mixture, water is contained as a medium. The polymerization reaction of the sulfur source and the dihalo aromatic compound is affected by the amount of water present in the polymerization reaction system. Therefore, typically, the water content in the polymerization reaction system is preferably adjusted by performing the dehydration step before the polymerization step.

In the dehydration step, at least a part of distillate containing water is discharged from the system, containing the mixture of an organic amide solvent, a sulfur source (preferably a sulfur source containing an alkali metal hydrosulfide), and at least a part of the total charged amount of the alkali metal hydroxide, to outside the system by heating the mixture preferably in an inert gas atmosphere. The dehydration step is performed in a reaction vessel and the discharging of the distillate to outside the system is typically performed by discharging the distillate to outside the reaction vessel. Water that should be dehydrated in the dehydration step includes hydrated water contained in the raw materials charged in the dehydration step, an aqueous medium of the aqueous mixture, and water produced by a side reaction between the raw materials, or the like.

Charging of the raw materials to the reaction vessel is typically performed in a range of approximately 20° C. to 300° C., and preferably approximately 20° C. to 200° C. The order of charging of the raw materials is not specified, and raw materials may be additionally charged in the middle of the dehydration operation. In the dehydration step, the organic amide solvent is used as a medium. The organic amide solvent used in the dehydration step is preferably the same organic amide solvent as the one used in the polymerization step. From the perspective of being readily available industrially at a low price, N-methyl-2-pyrrolidone (NMP) is more preferable. The amount of the organic amide solvent to be used is typically approximately from 0.1 to 10 kg per 1 mol of the sulfur source charged in the reaction vessel.

The dehydration operation is performed by, after charging the raw materials to the reaction vessel, heating the mixture containing the components described above at a temperature range of typically 300° C. or lower, and preferably in a range of 100 to 250° C., typically for 15 minutes to 24 hours, and preferably 30 minutes to 10 hours.

In the dehydration step, water and the organic amide solvent are distilled as vapor by heating. Therefore, the distillate contains water and the organic amide solvent. A part of the distillate may be refluxed in the system to suppress the discharging of the organic amide solvent to the outside of the system; however, at least a part of the distillate containing water is discharged outside the system to adjust the amount of water.

In the dehydration step, hydrogen sulfide originating from the sulfur source is volatilized. That is, in the dehydration step, when the mixture is heated, the sulfur source and water are reacted by heating to produce hydrogen sulfide and an alkali metal hydroxide, thereby volatilizing the gaseous hydrogen sulfide. For example, when 1 mol of alkali metal hydrosulfide and 1 mol of water are reacted, 1 mol of hydrogen sulfide and 1 mol of alkali metal hydroxide are produced. As at least a part of the distillate containing water is discharged outside the system, the volatilized hydrogen sulfide is also discharged outside the system.

Due to the hydrogen sulfide which is volatilized outside the system in the dehydration step, the amount of the sulfur source in the mixture remaining in the system after the dehydration step decreases relative to the amount of the charged sulfur source. When the sulfur source containing an alkali metal hydrosulfide as a main component is used, the amount of the sulfur source in the mixture remaining in the system after the dehydration step is substantially equal to the value obtained by subtracting the amount of moles of the hydrogen sulfide volatilized outside the system from the amount of moles of the charged sulfur source. The sulfur source in the mixture remaining in the system after the dehydration step can be called "effective sulfur source." This effective sulfur source corresponds to "charged sulfur source" in the preparation step and the subsequent polymerization step. Therefore, in the present invention, "charged sulfur source" indicates the effective sulfur source present in the mixture after the dehydration step.

The effective sulfur source after the dehydration step is a mixture containing the alkali metal hydrosulfide, the alkali metal sulfide, and the like; and specific form thereof is not particularly limited. It has been conventionally known that when an alkali metal hydrosulfide and an alkali metal hydroxide are heated in an organic amide solvent, the alkali metal hydrosulfide and the alkali metal hydroxide are reacted in situ to form an alkali metal sulfide. It is conceived that when an alkali metal hydroxide is added in the dehydration step, an alkali metal sulfide is produced by a reaction of the alkali metal hydrosulfide with the alkali metal hydroxide.

As described above, the amount of the sulfur source charged initially in the dehydration step decreases after the dehydration step due to volatilization of hydrogen sulfide to the outside of the system. Thus, it is necessary to quantify the amount of the sulfur source (effective sulfur source) in the mixture remaining in the system after the dehydration step based on the amount of the hydrogen sulfide volatilized outside the system.

In the dehydration step, water such as hydrated water, water medium, and byproduct water is dehydrated until the amount thereof is within the range of necessary amount. In the dehydration step, the dehydration is preferably performed until the amount of water becomes preferably 0 to 2 mol, and more preferably from 0.5 to 2 mol, per 1 mol of the effective sulfur source. When the amount of water is too small in the dehydration step, the amount of water can be adjusted to a desired amount by adding water in the preparation step performed before the polymerization step.

The alkali metal sulfide produces an alkali metal hydroxide via an equilibrium reaction with water. In the method of producing PAS using the sulfur source containing an alkali metal hydrosulfide as a main component, the molar ratio of the charged amount of the alkali metal hydroxide per 1 mol of the effective sulfur source is calculated taking the amount of the alkali metal sulfide, which is a component present in a small amount, into consideration. In the case of the alkali metal sulfide, when the hydrogen sulfide is volatilized outside the system in the dehydration step, the alkali metal hydroxide is produced in an amount by mole which is two times the amount of the volatilized hydrogen sulfide. Thus, the molar ratio of the charged amount of the alkali metal hydroxide per mole of the effective sulfur source is calculated taking the amount of the hydrogen sulfide volatilized outside the system in the dehydration step into consideration.

Preferably, in the dehydration step, a mixture containing the organic amide solvent, the sulfur source containing the alkali metal hydrosulfide, and the alkali metal hydroxide in an amount of typically 0.7 to 1.05 mol, and often 0.75 to 1 mol, per 1 mol of the sulfur source is heated to discharge at least a part of the distillate containing water from the system containing the mixture to the outside of the system.

When the molar ratio of the alkali metal hydroxide per 1 mol of the sulfur source is too small, a large amount of the hydrogen sulfide is volatilized during the dehydration step, thereby causing reduction in productivity due to decrease in the charged sulfur source amount. This also causes abnormal reaction due to increase in persulfide component in the charged sulfur source remaining after the dehydration, and readily causes deterioration in the quality of the produced PAS. When the molar ratio of the alkali metal hydroxide per 1 mol of the sulfur source is too large, deterioration of the organic amide solvent may increase.

The apparatus for performing the dehydration step may be the same as or different from the reaction vessel (reactor) used in the following polymerization step. The material of the apparatus is preferably a corrosion resistant material such as titanium. In the dehydration step, typically, a part of the organic amide solvent is discharged outside the reaction vessel together with the water. At this time, the hydrogen sulfide is discharged outside the system as a gas.

9. Preparation Step

In the preparation step, a preparation mixture having a pH of 12.5 or greater and containing the organic amide solvent, the sulfur source, the alkali metal hydroxide, water, and the dihalo aromatic compound is prepared. In general, the dehydration step is often performed before the preparation step. Thus, controlling of the pH and adjustment of the amount of each component in the preparation step are performed taking the amounts of the components in the mixture obtained in the dehydration step into consideration.

In the preparation step of the present invention, a preparation mixture having a pH of 12.5 or greater and containing the organic amide solvent, the sulfur source, the alkali metal hydroxide in an amount of 0.95 to 1.09 mol per 1 mol of the sulfur source, water in an amount of 0.5 to 2 mol per 1 mol of the sulfur source, and/or the dihalo aromatic compound in an amount of 0.95 to 1.2 mol per 1 mol of the sulfur source is preferably prepared.

In the preparation step, the preparation mixture containing the alkali metal hydroxide in an amount of typically from 0.85 to 1.2 mol, preferably from 0.9 to 1.1 mol, more preferably from 0.91 to 1 mol, and even more preferably from 0.95 to 1.09 mol per 1 mol of the sulfur source is prepared. When the molar ratio of the alkali metal hydroxide per 1 mol of the sulfur source is too large, deterioration of the organic amide solvent may be increased, and an abnormal reaction or a decomposition reaction during polymerization may be caused. Furthermore, the yield and quality of the produced PAS tend to be reduced more often. By setting the molar ratio of the alkali metal hydroxide per 1 mol of the sulfur source to be within the range described above, the pH can be easily adjusted to 12.5 or higher, thereby making it possible to stably perform the polymerization reaction, and making it possible to easily obtain high quality PAS.

The proportion of each of the components, such as an alkali metal hydroxide, is adjusted in a manner that the pH of the preparation mixture becomes 12.5 or higher, preferably from 12.5 to 13.5, and more preferably from 12.6 to 13.3. In the present invention, the polymerization reaction between the sulfur source and the dihalo aromatic compound is initiated by heating the preparation mixture in the first-stage polymerization step; however, when the pH of the preparation mixture is less than 12.5 at the beginning of the first-stage polymerization, it may be difficult to obtain PAS having a high degree of polymerization even if an alkali metal hydroxide is added in the middle of the first-stage polymerization. When the pH of the preparation mixture is too high, it is indicated that the amount of the alkali metal hydroxide is too high, and deterioration in the organic amide solvent may be increased and abnormal reaction and/or decomposition reaction may occur during the polymerization.

In the preparation step, the preparation mixture containing water in an amount of typically from 0.2 to 2 mol, preferably from 0.5 to 1.9 mol, and more preferably from 0.6 to 1.8 mol, per 1 mol of the sulfur source is prepared.

In the preparation step, the preparation mixture containing the dihalo aromatic compound in an amount of typically from 0.9 to 1.5 mol, preferably from 0.95 to 1.2 mol, more preferably from 0.99 to 1.1 mol, and even more preferably from 1 to 1.08 mol, per 1 mol of the sulfur source is prepared.

In the preparation step, the preparation mixture containing the organic amide solvent in an amount of typically from 0.1 to 10 kg, and preferably from 0.15 to 1 kg, per 1 mol of the sulfur source is prepared. The amount of the organic amide solvent may be varied in the middle of the polymerization step described below as long as it falls within the range described above.

The adjustment of the quantity ratio (molar ratio) of the components of the preparation mixture and/or adjustment of pH can be typically performed by adding a component, other than the sulfur source, to the mixture obtained in the dehydration step. For example, when the amounts of the alkali metal hydroxide and water in the mixture obtained in the dehydration step are small, these components are added in the preparation step. The dihalo aromatic compound is added in the preparation step. As a result, the preparation mixture is prepared.

10. Polymerization Step

In the present invention, the polymerization reaction is performed by at least two polymerization steps including the first-stage polymerization step and the second-stage polymerization step. More specifically, the polymerization step of the present invention includes: a first-stage polymerization step of initiating a polymerization reaction by heating the preparation mixture to a temperature of 170° C. or higher, and producing a prepolymer having a dihalo aromatic compound conversion rate of 50% or greater by allowing the polymerization reaction to continue at temperatures of 240 to 280° C.; and a second-stage polymerization step of adding an alkali metal hydroxide in an amount corresponding to 1 to 20 mol % per 1 mol of the sulfur source at a time or in portions to the reaction system containing the prepolymer in the presence of a phase separation agent, and continuing the polymerization reaction at a temperature of 245 to 290° C. The polymerization reaction time in each of the first-stage polymerization step and the second-stage polymerization step is generally in a range of 10 minutes to 72 hours, and preferably from 30 minutes to 48 hours. The first-stage polymerization step and the second-stage polymerization step may each include a plurality of steps in which temperature conditions are stepwise varied and water and the alkali metal hydroxide are separately added.

In the first-stage polymerization step, the polymerization reaction is performed in the reaction system in which the components including a polymer to be produced are uniformly dissolved. In the second-stage polymerization step, the polymerization reaction is continued in a state where a concentrated polymer phase and a dilute polymer phase are phase-separated in the presence of the phase separation agent. Since the polymerization reaction is generally performed with stirring, a phase-separated polymerization reaction is practically performed in a state where the concentrated polymer phase is dispersed as droplets in the organic amide solvent (dilute polymer phase). The phase-separated state can be clearly observed as the second-stage polymerization reaction proceeds.

The polymerization reaction method may be a batch method, a continuous method, or a combination of both methods. In the batch polymerization, a method in which two or more reaction vessels are used may be employed to shorten the polymerization cycle time.

10-1. First-Stage Polymerization Step

In the first-stage polymerization step, a prepolymer having a dihalo aromatic compound conversion ratio of 50% or higher is produced by initiating a polymerization reaction by heating the preparation mixture to a temperature of 170° C. or higher and continuing the polymerization reaction at temperatures of 240 to 280° C. The conversion ratio of the dihalo aromatic compound can be calculated by determining the amount of the dihalo aromatic compound remaining in the reaction mixture by gas chromatography and then performing a calculation based on the remaining amount of the dihalo aromatic compound, the charged amount of the dihalo aromatic compound, and the charged amount of the sulfur source.

In the first-stage polymerization step, the polymerization reaction is initiated using the preparation mixture having a pH of 12.5 or higher. As long as this condition is employed, the amount of at least one of water, the alkali metal hydroxide, and the organic amide solvent may be varied in the middle of the polymerization reaction. For example, water and the alkali metal hydroxide may be added to the reaction system in the middle of the polymerization. It is preferable that the preparation mixture prepared in the preparation step be typically used to initiate the polymerization reaction in the first-stage polymerization step and terminate the first-stage polymerization reaction.

In the first-stage polymerization step, it has been known that the polymerization reaction of the sulfur source and the dihalo aromatic compound contained in the preparation mixture starts when the temperature exceeds 170° C., and the reaction rate thereof increases as the temperature increases. Furthermore, it has been also known that, when the temperature exceeds 220° C. in the first-stage polymerization step, the polymerization reaction rate rapidly increases and, at the same time, side reactions tend to occur.

Therefore, the method of producing PAS of the present invention produces a prepolymer having a dihalo aromatic compound conversion ratio of 50% or higher, and preferably from 50 to 98%, by continuing the polymerization reaction in a high temperature range of 240 to 280° C., which has been thought to be undesirable from the perspectives of side reactions and decomposition reactions, in the first-stage polymerization step. The temperature when the polymerization reaction is continued is preferably in a range of 240 to 275° C., more preferably in a range of 240 to 270° C., and even more preferably in a range of 240 to 265° C. Typically, when the polymerization reaction is continued at high temperatures, the reaction rate is increased. Thus, reduction in the time required for the first-stage polymerization step (hereinafter, also referred to as "first-stage polymerization time") is expected. In the first-stage polymerization step that initiates the polymerization reaction by heating the preparation mixture to a temperature of 170° C. or higher and that allows the polymerization reaction to continue at temperatures of 240 to 280° C. (hereinafter, also referred to as "first-stage polymerization step at high temperatures"), after the temperature is increased to a particular temperature in a range of 240 to 280° C., the polymerization reaction may be continued while the temperature is maintained or may be continued while the temperature is increased to a particular temperature in a range of 240 to 280° C. by increasing the temperature continuously or stepwise. The polymerization reaction is preferably continued while the temperature is continuously increased from the perspectives of suppression of side reactions or decomposition reactions, shortening of the first-stage polymerization time, and the like.

In the first-stage polymerization step of the present invention, the temperature increasing rate for temperatures from 220° C. to 240° C. is preferably lower than the temperature increasing rate for temperatures of 240° C. or higher (specifically, the temperature increasing rate from a temperature of 240° C. to the temperature to continue the polymerization reaction which is in a range of 240 to 280° C.) from the perspectives of suppressing side reactions and controlling heat generation by the reaction. That is, the polymerization reaction of the sulfur source and the dihalo aromatic compound in the first-stage polymerization, which starts when the temperature exceeds 170° C. rapidly, proceeds when the temperature exceeds 220° C., and the side reactions readily occur along with the reaction. In the first-stage polymerization step of the present invention that continues the polymerization reaction at a high temperature region of 240 to 280° C., when the temperature is increased from the temperature of 170° C. at which the polymerization reaction starts to the temperature to continue the polymerization reaction which is in a range of 240 to 280° C. at a substantially uniform temperature increasing rate, it may be difficult to obtain a polymer having a desired high degree of polymerization due to various impurities (including oligomers, polymers having abnormal terminals) generated by side reactions. Therefore, side reactions can be suppressed by, before continuing the polymerization reaction at temperatures of 240 to 280° C., making the temperature increasing rate that is in the temperature region of 220° C. or higher at which side reactions as well as polymerization reaction rapidly proceeds and that is in the temperature region of 240° C. or lower that is passed during the temperature increasing procedure to be relatively small.

That is, in the first-stage polymerization step, by setting the temperature increasing rate for temperatures from 220° C. to 240° C. to be lower than the temperature increasing rate for temperatures of 240° C. or higher (specifically, the temperature increasing rate from a temperature of 240° C. to the temperature to continue the polymerization reaction which is in a range of 240 to 280° C.), a desired polymer having a high degree of polymerization and a high purity can be easily obtained at a high yield. The ratio of the temperature increasing rate for temperatures from 220° C. to 240° C. to the temperature increasing rate for temperatures of 240° C. or higher is typically 65% or less, preferably 60% or less, more preferably 55% or less, and even more preferably 50% or less. Although the lower limit of the ratio is not particularly limited, since the first-stage polymerization time and the time of the entire polymerization become long when the ratio is too small, desirably, the ratio is typically 5% or greater, and often 8% or greater.

10-2. Second-Stage Polymerization Step

Thereafter, in the second-stage polymerization step, an alkali metal hydroxide in an amount corresponding to 1 to 20 mol % per 1 mol of the sulfur source is added to the reaction system containing the prepolymer produced in the first-stage polymerization step described above at a time or in portions in the presence of a phase separation agent, and the polymerization reaction is continued at a temperature of 245 to 290° C. The polymerization temperature in the second-stage polymerization step is preferably from 250 to 280° C., and more preferably from 255 to 275° C. The polymerization temperature can be maintained at a fixed temperature. However, the polymerization temperature may be increased or decreased stepwise, as necessary. In the present invention, since the first-stage polymerization step is performed at a high temperature region, reduction in time and energy required for temperature increase by heating to the temperature at which the second-stage polymerization step is performed are expected.

Due to the presence of the phase separation agent, the polymerization reaction system (polymerization reaction mixture) is phase-separated into the concentrated polymer phase and the dilute polymer phase (phase mainly containing organic amide solvent). The phase separation may occur by adjusting the timing of adding the phase separation agent, adjusting the polymerization temperature, or the like, in the middle of the second-stage polymerization step.

When a method of adding water as the phase separation agent is employed in the second-stage polymerization step, the amount of water is adjusted so that the amount of water in the reaction system is typically greater than 4 mol and 20 mol or less, preferably from 4.1 to 14 mol, and more preferably from 4.2 to 10 mol, per kilogram of the organic amide solvent. This amount of water typically corresponds to an amount of greater than 2 mol but 10 mol or less, preferably from 2.3 to 7 mol, and more preferably from 2.5 to 5 mol, per 1 mol of the sulfur source.

In the second-stage polymerization step, after the characteristic first-stage polymerization step described above, in the production method of the present invention, an alkali metal hydroxide in an amount corresponding to 1 to 20 mol % per 1 mol of the sulfur source is added at a time or in portions in the presence of a phase separation agent, specifically at the time of adding the phase separation agent or at any time after addition of the phase separation agent. In the production method including the two-step polymerization steps in the present invention, PAS having a high degree of polymerization can be obtained at a high yield by the combination of the first-stage polymerization step in which the polymerization reaction is continued at a high temperature region of 240 to 280° C. (first-stage polymerization step at high temperatures) and the addition of the predetermined amount of the alkali metal hydroxide in the second-stage polymerization step in which the phase-separated polymerization reaction is performed.

In the second-stage polymerization step, the alkali metal hydroxide is preferably added by adjusting the amount thereof in a manner that the total amount of the alkali metal hydroxide becomes preferably from 1.01 to 1.1 mol, more preferably from 1.02 to 1.09 mol, and particularly preferably from 1.02 to 1.07 mol, per 1 mol of the sulfur source. The total amount of the alkali metal hydroxide is the total of the amount of the alkali metal hydroxide present in the preparation mixture and the amount of the alkali metal hydroxide added in the polymerization step.

In the second-stage polymerization step, for example, when a phase separation agent is added during the second-stage polymerization step, the alkali metal hydroxide may be added substantially at the same time as the addition of the phase separation agent or may be added in the middle of the second-stage polymerization. Furthermore, the alkali metal hydroxide may be added in portions. When the alkali metal hydroxide is added in portions as an aqueous mixture, the phase-separated polymerization in the second-stage polymerization step can be accelerated.

On the other hand, in the method of producing PAS including the two-step polymerization steps, even when the method including the first-stage polymerization step that allows the polymerization reaction to be continued at a high temperature region of 240 to 280° C. is employed, if the alkali metal hydroxide is not added in the second-stage polymerization step, PAS cannot be obtained at a high yield and also, depending on the reaction conditions, it may be difficult to stably obtain PAS having a high degree of polymerization.

11. Post-Treatment Step

In the production method of the present invention, a post-treatment after the polymerization reaction can be performed by an ordinary method. For example, when the reaction mixture is cooled after completion of the polymerization reaction, a slurry containing a granular polymer product is obtained. The cooled product slurry is separated by filtration as it is or after diluted with water or the like, then washed and filtered repeatedly, and dried. Thus, PAS can be recovered.

According to the production method of the present invention, a granular PAS polymer can be produced. The granular PAS polymer thus can be separated from the reaction solution and easily separated from the byproduct, the oligomer, and the like by a sieving method using a screen, for example. For the product slurry, the polymer may be sieved at high temperatures. Specifically, the granular PAS polymer which is separated with a 100-mesh screen (also referred to as "100 mesh-on") can be used as a product PAS.

After the filtration (sieving) described above, the PAS is preferably washed with the organic amide solvent, which is the same as the polymerization solvent, or an organic solvent such as ketones (e.g. acetone) and alcohols (e.g. methanol). The PAS may be washed with high-temperature water. The produced PAS may be treated with an acid or a salt such as ammonium chloride.

12. Polyarylene Sulfide

According to the production method of the present invention, a granular PAS can be obtained at a high yield of typically 85% or greater, further 87% or greater, and, if desired, 90% or greater. According to the production method of the present invention, by adding a predetermined amount of the alkali metal hydroxide in the second-stage polymerization step that is after the first-stage polymerization step at a high temperature region, enhancement of yield by 1.8% or greater, depending on the reaction condition, by 2% or greater or, furthermore, 3% or greater can be achieved compared to the case where no alkali metal hydroxide is contained.

According to the production method of the present invention, PAS having a high degree of polymerization and a melt viscosity measured at a temperature of 310° C. and a shear rate of 1216 $sec^{-1}$ of typically from 0.1 to 8000 Pa·s, preferably from 1 to 800 Pa·s, more preferably from 5 to 400 Pa·s, and even more preferably from 10 to 200 Pa·s, can be obtained at a high yield. The PAS obtained by the production method of the present invention can be used in a wide variety of uses. According to the production method of the present invention, the melt viscosity of the PAS can be 50 Pa·s or greater and, furthermore, 60 Pa·s or greater, if desired.

In the production method of the present invention, although the reason why the enhancement in yield can be achieved by the combination of the first-stage polymerization step at a high temperature region (first-stage polymerization step at high temperatures) and the addition of the alkali metal hydroxide in the second-stage polymerization step (hereinafter, also referred to as "post-addition of alkali"), it is presumed that the effect is exhibited by balancing the increase in reaction rate for performing the polymerization reaction at a high temperature region and the suppression of side reactions achieved by controlling the pH or the amount of the alkali metal hydroxide in the reaction system to be within appropriate ranges.

The PAS obtained by the production method of the present invention can be formed into various injection molded products or extrusion molded products such as sheets, films, fibers, pipes, and the like, as it is or after undergoing oxidative-crosslinking, alone or by blending with various inorganic fillers, fibrous fillers, and various synthetic resins, if desired. The PAS obtained by the production method of the present invention exhibits excellent color tone. Furthermore, the PAS compound obtained by the production method of the present invention produces a small amount of volatile components and is also suitable for fields of electronic devices, and the like in which suppression of volatile components is expected. The PAS is particularly preferably PPS.

EXAMPLES

The present invention will be more specifically described hereinafter with reference to examples and comparative examples. Measurement methods for various types of characteristics and physical properties are as shown below.

(1) Yield

As the yield of a polymer, a proportion of the weight of the polymer actually recovered relative to a reference value, which was the weight of the polymer (theoretical amount) obtained by assuming that all effective sulfur source present in a reactor after the dehydration step was converted into the polymer, was calculated (unit: mass %).

(2) Melt Viscosity

The melt viscosity was measured with a Capirograph 1-C manufactured by Toyo Seiki Seisaku-sho, Ltd. using approximately 20 g of a dried polymer. At this time, a flat die having a diameter of 1 mm and a length of 10 mm was used as the capillary, and the temperature was set to 310° C. The polymer sample was introduced into the instrument. After the sample was held for 5 minutes, the melt viscosity (hereinafter also referred to as "MV") at a shear rate of 1216 $sec^{-1}$ was measured (unit: Pa·s).

Example 1

First-Stage Polymerization Step at High Temperatures and Post-Addition of Alkali were Performed 1. Dehydration Step:

In a 20 L autoclave (reactor) made of titanium, 2001 g of a 62.4 mass % sodium hydrosulfide (NaSH) aqueous solution (22.3 mol in terms of NaSH content) and 1120 g of a 73.5 mass % sodium hydroxide (NaOH) aqueous solution (20.6 mol in terms of NaOH content) were placed together with 5999 g of N-methyl-2-pyrrolidone (NMP). When the sulfur source formed from the sodium hydrosulfide and the sodium sulfide is denoted as "S", NaOH/NaSH before the dehydration was 0.92 (mol/mol).

After the inside of the reactor was purged with nitrogen gas, the temperature was gradually increased to 200° C. over a period of 3 hours while the contents in the reactor were being stirred, thereby 989 g of water and 1264 g of NMP were distilled. At this time, 0.37 mol of hydrogen sulfide ($H_2S$) was volatilized. The effective S amount (i.e. amount of "charged sulfur source") in the reactor after the dehydration step was 21.9 mol.

2. Preparation Step:

After the dehydration step, the reactor containing 21.9 mol of the effective S (charged sulfur source) was cooled to the temperature of 150° C., then 3412 g of p-dichlorobenzene (hereinafter, abbreviated as "pDCB") [pDCB/effective S=1.06 (mol/mol)], 3478 g of NMP, and 160 g of water [total water content in the reactor/NMP=4.0 (mol/kg); total water content in the reactor/effective S=1.5 (mol/mol)] were added, and 26 g of NaOH with a purity of 97% was added so that the NaOH in the reactor/effective S became 1.00 (mol/mol). NaOH (0.7 mol) produced by the volatilization of $H_2S$ was contained in the reactor. The pH of the preparation mixture at this time was 12.8. pH was the value measured using a pH meter.

3. Polymerization Step:

First-Stage Polymerization Step

While the preparation mixture was stirred by rotating a stirrer provided in the reactor at 250 rpm, the temperature was continuously increased from 220° C. to 240° C. over 60 minutes (temperature increasing rate: 0.33° C./min) and then continuously increased from 240° C. to 260° C. over 30 minutes (temperature increasing rate: 0.67° C./min) to continue the polymerization reaction (first-stage polymerization step at high temperatures). The conversion ratio of pDCB after completion of the first-stage polymerization step was 89%.

Second-Stage Polymerization Step

Thereafter, the rotational speed of the stirrer was increased to 400 rpm and, while the stirring was continued, 434 g of water and 82 g of a 73.5 mass % NaOH aqueous solution were injected [total water content in the reactor/NMP=7.1 mol/kg; total water content in the reactor/effective S=2.65 (mol/mol); total NaOH/effective S (hereinafter, also referred to as "NaOH/S")=1.07 (mol/mol)] and reacted for 3 hours by increasing the temperature to 265° C.

4. Post-Treatment Step:

After completion of the reaction, the reaction mixture was cooled to around room temperature, and the reaction solution was passed through a 100-mesh screen. Thus, a granular polymer was separated by sieving. The separated polymer was washed twice with acetone, then washed three times with water, washed with a 0.3% acetic acid aqueous solution, and washed four times with water to obtain a washed polymer. The washed polymer was dried at 105° C. for 13 hours. The yield of the granular PAS polymer obtained as described above was 90.0%, and the melt viscosity of the PAS polymer was 20 Pa·s.

Comparative Example 1

First-Stage Polymerization Step at High Temperatures was Performed but Post-Addition of Alkali was not Performed The dehydration step was performed in the same manner as in Example 1 except that 1220 g of a 73.6 mass % NaOH aqueous solution was placed in a reactor, 970 g of water and 1243 g of NMP were distilled and, at this time, 0.35 mol of hydrogen sulfide ($H_2S$) was volatilized and except that the effective S amount (i.e. amount of "charged sulfur source") in the reactor after the dehydration step was 21.9 mol. Thereafter, a granular PAS polymer was obtained by performing the polymerization step and the post-treatment step in the same manner as in Example 1 except that 15.0 g of NaOH with a purity of 97% and 83 g of water were added in a manner that the NaOH in the reactor/effective S was 1.07 (mol/mol) in the preparation step and that no injection of a NaOH aqueous solution was performed although 455 g of water was injected in the second-stage polymerization step [post-addition of alkali was not performed; the total water content in the reactor/NMP=7.1 (mol/kg); the total water content in the reactor/effective S=2.65 (mol/mol); total NaOH/effective S=1.07 (mol/mol)]. The yield of the obtained granular PAS polymer was 87.9%, and the melt viscosity of the PAS polymer was 20 Pa·s.

Comparative Example 2

First-Stage Polymerization Step at High Temperatures was not Performed but Post-Addition of Alkali was Performed A granular PAS polymer was obtained by performing the polymerization step and the post-treatment step in the same manner as in Example 1 except that the polymerization reaction was performed at a temperature of 220° C. for 1 hour and then the temperature was increased to 230° C. over 30 minutes to perform polymerization reaction for 1.5 hours in the first-stage polymerization step (first-stage polymerization step at high temperatures was not performed). The yield of the obtained granular PAS polymer was 88.7%. The melt viscosity of the PAS polymer was 25 Pa·s.

Comparative Example 3

First-Stage Polymerization Step at High Temperatures was not Performed and Post-Addition of Alkali was not Performed A granular PAS polymer was obtained by performing the polymerization step and the post-treatment step in the same manner as in Comparative Example 1 except that the polymerization reaction was performed at the temperature of 220° C. for 1 hour and then the temperature was increased to 230° C. over 30 minutes to perform the polymerization reaction for 1.5 hours in the first-stage polymerization step (first-stage polymerization step at high temperatures was not performed). The yield of the obtained granular PAS polymer was 88.1%, and the melt viscosity of the PAS polymer was 23 Pa·s.

Example 2

First-Stage Polymerization Step at High Temperatures and Post-Addition of Alkali were Performed 1. Dehydration Step:

In a 20 L autoclave (reactor) made of titanium, 2003 g of a 62.0 mass % sodium hydrosulfide aqueous solution (22.2 mol in terms of NaSH content) and 1139 g of a 73.6 mass % sodium hydroxide (NaOH) aqueous solution (21.0 mol in terms of NaOH content) were placed together with 6003 g of NMP. When the sulfur source formed from the sodium hydrosulfide and the sodium sulfide is denoted as "S", NaOH/NaSH before the dehydration was 0.94 (mol/mol).

After the inside of the reactor was purged with nitrogen gas, the temperature was gradually increased to 200° C. over a period of 3 hours while the contents in the reactor were being stirred, thereby 999 g of water and 733 g of NMP were distilled. At this time, 0.4 mol of hydrogen sulfide ($H_2S$) was volatilized. Therefore, the effective S amount in the reactor after the dehydration step was 21.8 mol.

2. Preparation Step:

After the dehydration step, the reactor containing 21.8 mol of the effective S (charged sulfur source) was cooled to 150° C., then 3298 g of p-dichlorobenzene (pDCB) [pDCB/effective S=1.03 (mol/mol)], 2899 g of NMP, and 150 g of water [total water content in the reactor/NMP=4.0 (mol/kg); total water content in the reactor/effective S=1.50 (mol/mol)] were added, and 2 g of NaOH with a purity of 97% was added so that the NaOH in the reactor/effective S became 1.00 (mol/mol). NaOH (0.8 mol) produced by the volatilization of $H_2S$ was contained in the reactor. The pH of the preparation mixture at this time was 12.9.

3. Polymerization Step:

First-Stage Polymerization Step

While the preparation mixture was stirred by rotating a stirrer provided in the reactor at 250 rpm, the polymerization reaction was continued by increasing the temperature in the same manner as in Example 1 (first-stage polymerization step at high temperatures). The conversion ratio of pDCB after completion of the first-stage polymerization step was 90%.

Thereafter, the rotational speed of the stirrer was increased to 400 rpm and, while the stirring was continued, 430 g of water and 70 g of a 73.6 mass % NaOH aqueous solution were injected [total water content in the reactor/NMP=7.1 (mol/kg); total water content in the reactor/effective S=2.65 (mol/mol); total NaOH/effective S=1.06 (mol/mol)] and reacted for 3 hours by increasing the temperature to 265° C. (second-stage polymerization step).

4. Post-Treatment Step:

After completion of the reaction, the reaction mixture was cooled to around room temperature, and the reaction solution was passed through a 100-mesh screen. Thus, a granular polymer was separated by sieving. The separated polymer was washed twice with acetone, then washed three times with water, washed with a 0.3% acetic acid aqueous solution, and washed four times with water to obtain a washed polymer. The washed polymer was dried at 105° C. for 13 hours. The yield of the granular PAS polymer obtained as described above was 93%, and the melt viscosity of the PAS polymer was 63 Pa·s.

Comparative Example 4

First-Stage Polymerization Step at High Temperatures was Performed but Post-Addition of Alkali was not Performed The dehydration step was performed in the same manner as in Example 2 except that 1188 g of a 73.6 mass % NaOH aqueous solution was placed in a reactor, 975 g of water and 710 g of NMP were distilled and, at this time, 0.35 mol of hydrogen sulfide ($H_2S$) was volatilized and except that the effective S amount (i.e. amount of "charged sulfur source") in the reactor after the dehydration step was 21.8 mol. Thereafter, a granular PAS polymer was obtained by performing the polymerization step and the post-treatment step in the same manner as in Example 2 except that 25.0 g of NaOH with a purity of 97% and 95 g of water were added in a manner that the NaOH in the reactor/effective S was 1.06 (mol/mol) in the preparation step and that no injection of a NaOH aqueous solution was performed in the second-stage polymerization step [post-addition of alkali was not performed; the total water content in the reactor/NMP=7.1 (mol/kg); the total water content in the reactor/effective S=2.65 (mol/mol); total NaOH/effective S=1.06 (mol/mol)]. The yield of the obtained granular PAS polymer was 89.7%, and the melt viscosity of the PAS polymer was 54 Pa·s.

Comparative Example 5

First-Stage Polymerization Step at High Temperatures was not Performed but Post-Addition of Alkali was Performed A granular PAS polymer was obtained by performing the polymerization step and the post-treatment step in the same manner as in Example 2 except that the polymerization reaction was performed at a temperature of 220° C. for 1 hour and then the temperature was increased to 230° C. over 30 minutes to perform polymerization reaction for 1.5 hours in the first-stage polymerization step (first-stage polymerization step at high temperatures was not performed). The yield of the obtained granular PAS polymer was 92.5%, and the melt viscosity of the PAS polymer was 85 Pa·s.

Comparative Example 6

First-Stage Polymerization Step at High Temperatures was not Performed and Post-Addition of Alkali was not Performed A granular PAS polymer was obtained by performing the polymerization step and the post-treatment step in the same manner as in Comparative Example 4 except that the polymerization reaction was performed at a temperature of 220° C. for 1 hour and then the temperature was increased to 230° C. over 30 minutes to perform the polymerization reaction for 1.5 hours in the first-stage polymerization step (first-stage polymerization step at high temperatures was not performed). The yield of the obtained granular PAS polymer was 92.1%, and the melt viscosity of the PAS polymer was 88 Pa·s.

For Examples 1 and 2 and Comparative Examples 1 to 6, the composition (pDCB/effective S), conditions of the first-stage polymerization and the second-stage polymerization, yield of the PAS polymer, and the melt viscosity (MV) of the PAS are shown in Table 1.

TABLE 1

I

|  | | Example 1 | Comparative Example 1 | Comparative Example 2 | Comparative Example 3 |
|---|---|---|---|---|---|
| pDCB/effective S mol/mol | | 1.06 | | | |
| First-stage polymerization step | | First-stage polymerization step at high temperatures 220 →240° C. (60 min) 240 →260° C. (30 min) | | 220° C./1 hr (30 min) →230° C./1.5 hr | |
| Second-stage polymerization step | NaOH addition | Performed | Not performed | Performed | Not performed |
|  | NaOH/S mol/mol | | | 1.07 | |
| Yield of PAS polymer | % | 90.0 | 87.9 | 88.7 | 88.1 |
| Increase in yield | % | 2.1 | | 0.6 | |
| MV | Pa · s | 20 | 20 | 25 | 23 |

II

|  | | Example 2 | Comparative Example 4 | Comparative Example 5 | Comparative Example 6 |
|---|---|---|---|---|---|
| pDCB/effective S mol/mol | | 1.03 | | | |
| First-stage polymerization step | | First-stage polymerization step at high temperatures 220 →240° C. (60 min) 240 →260° C. (30 min) | | 220° C./1 hr (30 min) →230° C./1.5 hr | |
| Second-stage polymerization step | NaOH addition | Performed | Not performed | Performed | Not performed |
|  | NaOH/S mol/mol | | | 1.06 | |
| Yield of PAS polymer | % | 93.0 | 89.7 | 92.5 | 92.1 |
| Increase in yield | % | 3.3 | | 0.4 | |
| MV | Pa · s | 63 | 54 | 85 | 88 |

The following results were clear from Table 1.

(1) According to Examples 1 and 2, in which the first-stage polymerization step at high temperatures and the post-addition of alkali, which was specifically NaOH addition (hereinafter, also referred to as "post-addition of NaOH"), in the second-stage polymerization step were performed, PAS polymers were produced at high yields of 90% or greater. Regarding the PAS polymers obtained in Examples 1 and 2, it was clear from MVs thereof that the PAS polymers having high degrees of polymerization were obtained.

(2) As is clear from the comparison between Example 1 and Comparative Example 1, and Example 2 and Comparative Example 4, in which NaOH/S were the same in the second-stage polymerization step, the yield of the PAS polymer was increased due to the post-addition of NaOH.

(3) As is clear from the comparison between Example 1 and Comparative Example 2, and Example 2 and Comparative Example 5, in which the post-addition of NaOH was performed, the yield of the PAS polymer was increased by performing the first-stage polymerization step at high temperatures.

(4) The increase in yield of the PAS polymer by the post-addition of NaOH becomes significant by performing the first-stage polymerization step at high temperatures as is clear from the comparison between the ratios of the yield increase of Example 1 to Comparative Example 1 in which the first-stage polymerization step at high temperatures was performed and the ratios of the yield increase of Comparative Example 2 to Comparative Example 3 in which no first-stage polymerization step at high temperatures was performed, as well as the comparison between the ratios of the yield increase of Example 2 to Comparative Example 4 in which the first-stage polymerization step at high temperatures was performed and the ratios of the yield increase of Comparative Example 5 to Comparative Example 6 in which no first-stage polymerization step at high temperatures was performed.

(5) As is clear from the descriptions above, it was found that PAS polymer having a high degree of polymerization was obtained at a high yield according to Examples 1 and 2 in which the first-stage polymerization step at high temperatures and the post-addition of NaOH were performed.

According to the combination of the first-stage polymerization step at high temperatures and the post-addition of alkali in the production method of the present invention, it is presumed that the effects described above can be exhibited by balancing the increase in reaction rate for performing the polymerization reaction at a high temperature region and the suppression of side reactions achieved by controlling the pH or the amount of the alkali metal hydroxide in the reaction system to be within appropriate ranges. Furthermore, according to the combination of the first-stage polymerization step at high temperatures and the post-addition of alkali, it was found that the time required for the first-stage polymerization step and the total time required for the polymerization step including the first-stage polymerization step and the second-stage polymerization step were reduced.

INDUSTRIAL APPLICABILITY

According to the present invention, by a method of producing PAS by subjecting a sulfur source and a dihalo aromatic compound to polymerization in an organic amide solvent, the method comprising:

(1) a preparation step of preparing a preparation mixture containing an organic amide solvent, a sulfur source, an alkali metal hydroxide, water, and a dihalo aromatic compound, and having a pH of 12.5 or higher;

(2) a first-stage polymerization step of heating the preparation mixture to a temperature of 170° C. or higher to initiate a polymerization reaction and continuing the polymerization reaction at temperatures of 240 to 280° C., thereby forming a prepolymer having a dihalo aromatic compound conversion rate of 50% or greater; and (3) a second-stage polymerization step of adding an alkali metal hydroxide in an amount corresponding to 1 to 20 mol % per 1 mol of the sulfur source at a time or in portions into the reaction system containing the prepolymer in the presence of a phase separation agent, thereby continuing the polymerization reaction at a temperature of 245 to 290° C.; a temperature increasing rate for temperatures from 220° C. to 240° C. being lower than a temperature increasing rate for temperatures of 240° C. or higher in the first-stage polymerization step; and by the PAS produced by the production method of PAS having a melt viscosity of 0.1 to 8000 Pa·s measured at a temperature of 310° C. and a shear rate of 1216 sec$^{-1}$, the method of producing PAS having a high degree of polymerization at a high yield, the method subjecting the sulfur source and the dihalo aromatic compound to polymerization reaction in the organic amide solvent under alkaline conditions and the method suppressing side reactions or the like caused along with the addition of the alkali metal hydroxide, and the PAS having a high degree of polymerization and being produced at a high yield can be provided. Therefore, the present invention is highly industrially applicable.

The invention claimed is:

1. A method of producing polyarylene sulfide by subjecting a sulfur source and a dihalo aromatic compound to polymerization in an organic amide solvent, the method comprising:

(1) a preparation step of preparing a preparation mixture containing an organic amide solvent, a sulfur source, an alkali metal hydroxide, water, and a dihalo aromatic compound, and having a pH of 12.5 or higher;

(2) a first-stage polymerization step of heating the preparation mixture to a temperature of 170° C. or higher to initiate a polymerization reaction and continuing the polymerization reaction at temperatures of higher than 240° C. but 280° C. or lower, thereby forming a prepolymer having a dihalo aromatic compound conversion rate of 50% or greater; and (3) a second-stage polymerization step of adding an alkali metal hydroxide in an amount corresponding to 1 to 20 mol % per 1 mol of the sulfur source at a time or in portions into the reaction system containing the prepolymer in the presence of a phase separation agent, thereby continuing the polymerization reaction at temperatures of 245 to 290° C., wherein a ratio of a temperature increasing rate for temperatures from 220° C. to 240° C. to a temperature increasing rate for temperatures of 240° C. to 280° C. in the first-stage polymerization step is 65% or less.

2. The method of producing polyarylene sulfide according to claim 1, wherein the sulfur source contains one or both of an alkali metal sulfide and an alkali metal hydrosulfide.

3. The method of producing polyarylene sulfide according to claim 1, further comprising a dehydration step of heating a mixture containing an organic amide solvent, a sulfur source, and an alkali metal hydroxide to discharge at least a part of distillate containing water from a system containing the mixture to the outside of the system before the preparation step.

4. The method of producing polyarylene sulfide according to claim 1, wherein, in the preparation step, the preparation mixture containing the alkali metal hydroxide in an amount of 0.95 to 1.09 mol per 1 mol of the sulfur source is prepared.

5. The method of producing polyarylene sulfide according to claim 1, wherein, in the preparation step, the preparation mixture containing water in an amount of 0.5 to 2 mol per 1 mol of the sulfur source is prepared.

6. The method of producing polyarylene sulfide according to claim 1, wherein, in the preparation step, the preparation mixture containing the dihalo aromatic compound in an amount of 0.95 to 1.2 mol per 1 mol of the sulfur source is prepared.

7. The method of producing polyarylene sulfide according to claim 1, wherein, in the second-stage polymerization step, the alkali metal hydroxide is added in a manner that a total amount of the alkali metal hydroxide is from 1.01 to 1.1 mol per 1 mol of the sulfur source.

8. The method of producing polyarylene sulfide according to claim 1, wherein the phase separation agent is at least one type selected from the group consisting of an organic carboxylic acid metal salt, an organic sulfonic acid metal salt, an alkali metal halide, an alkaline earth metal halide, an alkaline earth metal salt of aromatic carboxylic acid, a phosphoric acid alkali metal salt, an alcohol, a paraffin hydrocarbon, and water.

* * * * *